United States Patent [19]

Ono et al.

[11] 4,057,614
[45] Nov. 8, 1977

[54] PROCESS FOR PRODUCING SODIUM FLUORIDE FROM SODIUM SILICOFLUORIDE

[75] Inventors: Tetsuhiro Ono; Minoru Aramaki; Tamotsu Mizuno; Masao Fujinaga, all of Ube, Japan

[73] Assignee: Central Glass Company, Limited, Ube, Japan

[21] Appl. No.: 738,626

[22] Filed: Nov. 3, 1976

[30] Foreign Application Priority Data

Nov. 4, 1975  Japan .................................. 50-131402

[51] Int. Cl.² .................. C01D 3/02; C01B 33/12; C01C 1/16; C01B 33/00
[52] U.S. Cl. .................................. 423/490; 423/339; 423/341; 423/470
[58] Field of Search ............. 423/341, 490, 339, 470

[56] References Cited

U.S. PATENT DOCUMENTS

| | | | |
|---|---|---|---|
| 3,024,086 | 3/1962 | Cines | 423/490 |
| 3,755,546 | 8/1973 | Lichstein et al. | 423/341 |
| 3,907,973 | 9/1975 | Kidde | 423/341 |
| 3,968,197 | 7/1976 | Satoh et al. | 423/490 |

Primary Examiner—Edward Stern
Attorney, Agent, or Firm—Fleit & Jacobson

[57] ABSTRACT

A process for producing sodium fluoride from sodium silicofluoride in which sodium silicofluoride is added to an ammonium fluoride solution for double decomposition reaction to obtain a slurry containing sodium fluoride as crystals and ammonium silicofluoride in dissolved form, and the solution from which the sodium fluoride crystals have been removed is added with ammonia to decompose the ammonium silicofluoride into silica and ammonium fluoride. The ammonium fluoride obtained by the decomposition is recycled to the double decomposition step. Alternatively, the ammonium fluoride is reacted with a sodium salt for recovery as sodium fluoride.

8 Claims, 1 Drawing Figure

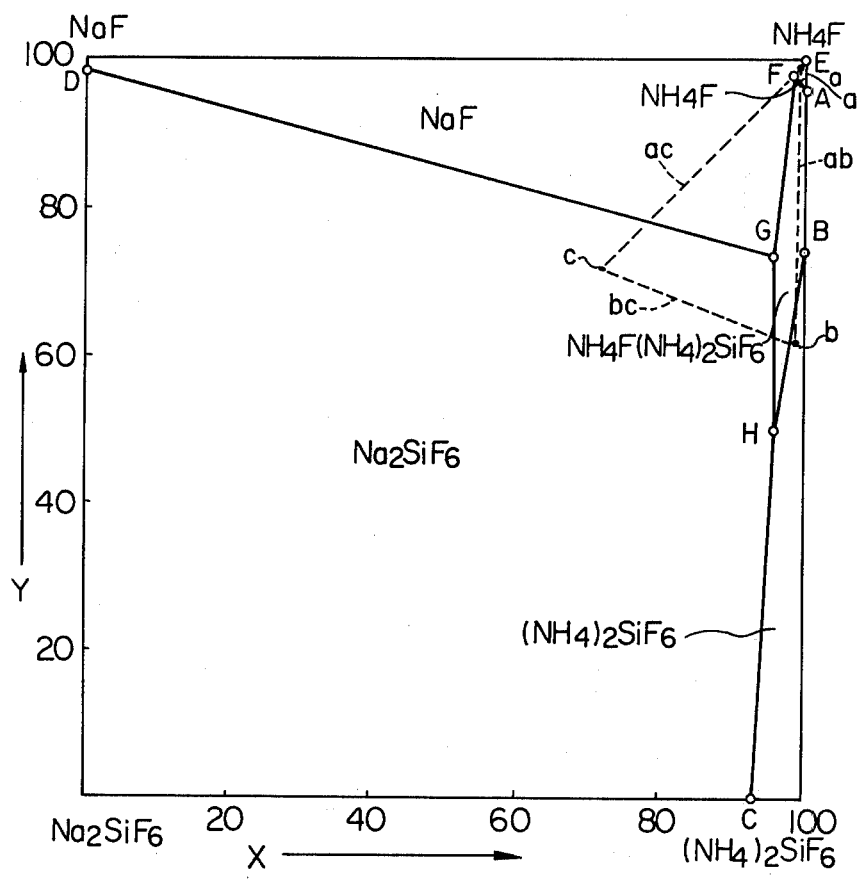

PROCESS FOR PRODUCING SODIUM FLUORIDE FROM SODIUM SILICOFLUORIDE

This invention relates to a process for producing sodium fluoride from sodium silicofluoride.

As well known in the art, sodium silicofluoride which is secondarily produced from a wet phosphoric acid production process or other processes is decomposed to produce ammonium fluoride and sodium fluoride. The decomposition reaction is generally conducted by adding ammonia to a sodium silicofluoride slurry of relatively high sodium silicofluoride content, as shown in the following reaction formula (1)

$$Na_2SiF_6 + 4NH_3 + 2H_2O \rightarrow 4NH_4F + 2NaF \downarrow + SiO_2 \downarrow \qquad (1)$$

In the above reaction, the ammonia fluoride is obtained in the form of an aqueous solution, while sodium fluoride and silica coprecipitate in solid form. The thus coprecipitated solid sodium fluoride and silica are generally separated from each other typically by the following methods:

1. A physial separation using the specific gravity difference therebetween; and
2. A method for separating silica from sodium fluoride by dissolving silica alone in a caustic soda solution.

However, these methods are not advantageous from an industrial point of view: the method (1) has a difficulty in obtaining highly pure sodium fluoride, i.e., the purity is generally as low as 75 - 85%; the method (2) is high in production cost due to the use of caustic soda, and sodium silicate secondarily produced by the method (2) undesirably contains about 1% of sodium fluoride, reducing the commercial value to a considerable extent.

It is an object of the present invention to provide a process for producing sodium fluoride from sodium silicofluoride which overcomes the disadvantages of the known methods.

It is another object of the present invention to provide a process for producing highly pure sodium fluoride from sodium silicofluoride by double decomposition reaction of sodium silicofluoride with ammonium fluoride.

It is a further object of the present invention to provide a process for producing sodium fluoride from sodium silicofluoride which is simple and easy in operation and which is excellent in economy.

It is a still further object of the invention to provide a process for producing sodium fluoride from sodium silicofluoride which is feasible by a continuous manner.

These and other objects and advantages of the invention will be apparent from the drawing and description thereof and the appended claims.

Referring to the drawing, a sole FIGURE is an equilibrium diagram of reciprocal salt pairs of the Na-F—NH$_4$F—NaSiF$_6$—(NH$_4$)$_2$SiF$_6$—H$_2$O system. In broad aspect, the process for producing sodium fluoride from sodium silicofluoride in accordance with the invention comprises the first step of adding sodium silicofluoride to an ammonium fluoride solution for double decomposition reaction to separate sodium fluoride as crystal and separating the sodium fluoride crystals from the solution containing ammonium silicofluoride, and the second step of adding ammonia to the solution whereby the ammonium silicofluoride is decomposed into silica and ammonium fluoride. The ammonium fluoride solution obtained in the second step may be recycled to the first step for decomposing sodium silicofluoride, or may be added with a sodium salt in an Na/F molar ratio of 1.0 - 1.5 to convert the ammonium fluoride to sodium fluoride.

In the first step, when sodium silicofluoride is reacted with an excess of ammonium fluoride, the double decomposition takes place according to the following reaction formula (2), with sodium fluoride precipitating from the solution $$Na_2SiF_6 + 2NH_4F \rightarrow 2NaF \downarrow + (NH_4)_2SiF_6 \qquad (2)$$

While, in the second step, the ammonium silicofluoride solution from which sodium fluoride has been separated by suitable means is added with ammonia gas or aqueous ammonia to decompose ammonium silicofluoride into silica and ammonium fluoride according to the reaction formula (3)

$$(NH_4)_2SiF_6 + 4NH_3 + 2H_2O \rightarrow 6NH_4F + SiO_2 \downarrow \qquad (3)$$

After separation of the precipitated silica from the ammonium fluoride solution, all or part of the solution may be fed back to the first step. Alternatively, the ammonium fluoride may be converted to sodium fluoride by adding to the ammonium fluoride solution a sodium salt such as sodium chloride, sodium hydrogencarbonate, sodium sulfate or sodium nitrate. This reaction can be represented by the following formula (4) using sodium chloride as the sodium salt.

$$NH_4F + NaCl \rightarrow NaF + NH_4Cl \qquad (4)$$

In order to carry out the double decomposition reaction of the first step of the present invention, it is preferred to make use of an equilibrium diagram, as shown in the sole FIGURE, of reciprocal salt pairs of an NaF—NH$_4$F—Na$_2$SiF$_6$—(NH$_4$)$_2$SiF$_6$—H$_2$O system which has been prepared by us on the basis of experimental data. The equilibrium diagram which is shown in the FIGURE by way of illustration is obtained as the result of the equilibrium test at 80° C wherein the NaF—NH$_4$F—Na$_2$SiF$_6$—(NH$_4$)$_2$SiF$_6$—H$_2$O system is so controlled as to have the liquid composition and the solid phases corresponding to the points A through H. The points A through H and the corresponding phases are summarized in Table 1 below.

TABLE 1

(at 80° C)

| | Charged composition for equilibrium test (g) | | | | | Test results (g equivalent/kg.H$_2$O) | | | | | | Precipitated ** solid phase |
|---|---|---|---|---|---|---|---|---|---|---|---|---|
| | NH$_4$F | (NH$_4$)$_2$SiF$_6$ | Na$_2$SiF$_6$ | NaF | H$_2$O | NH$_4^+$ | Na$^+$ | F$^-$ | SiF$_6^{2-}$ | X * | Y * | |
| A | 50 | 5 | — | — | 30 | 30.3 | 0 | 29.0 | 1.3 | 1.00 | 0.96 | a,b |
| B | 15 | 30 | — | — | 35 | 9.4 | 0 | 7.0 | 2.4 | 1.00 | 0.75 | b,c |
| C | — | 30 | 5 | — | 45 | 5.3 | 0.4 | 0 | 5.7 | 0.93 | 0 | c,d |
| D | — | — | 5 | 10 | 65 | 0 | 1.09 | 1.07 | 0.02 | 0 | 0.98 | d,e |
| E | 45 | — | — | 5 | 30 | 30.3 | 0.2 | 30.5 | 0 | 0.99 | 1.00 | e,a |
| F | 40 | 15 | — | 5 | 30 | 31.3 | 0.6 | 30.9 | 0.8 | 0.98 | 0.98 | a,b,e |

TABLE 1-continued

| | Charged composition for equilibrium test (g) | | | | | Test results (at 80° C) (g equivalent/kg.H$_2$O) | | | | | | Precipitated ** solid phase |
|---|---|---|---|---|---|---|---|---|---|---|---|---|
| | NH$_4$F | (NH$_4$)$_2$SiF$_6$ | Na$_2$SiF$_6$ | NaF | H$_2$O | NH$_4^+$ | Na$^+$ | F$^-$ | SiF$_6^{2-}$ | X * | Y * | |
| G | 5 | 30 | — | 10 | 45 | 8.6 | 0.5 | 6.8 | 2.3 | 0.95 | 0.75 | b,d,e |
| H | 10 | 30 | 10 | — | 30 | 9.0 | 0.4 | 4.8 | 4.6 | 0.96 | 0.51 | b,c,d |

Note: 
$$* \quad X = \frac{[NH_4^+]}{[NH_4^+] + [Na^+]} \quad Y = \frac{[F^-]}{[F^-] + [SiF_6^{2-}]}$$

** a: NH$_4$F, b: NH$_4$F·(NH$_4$)$_2$SiF$_6$, c: (NH$_4$)$_2$SiF$_6$, d: Na$_2$SiF$_6$, e: NaF

For reference, the values of the compositions in equilibrium at the point G for different temperatures will be indicated in Table 2.

Table 2

| temperature (° C) | Test results (g equivalent/kg · 2O) | | | | | |
|---|---|---|---|---|---|---|
| | NH$_4^+$ | Na$^+$ | F$^-$ | SiF$_6^{2-}$ | X | Y |
| 40 | 6.5 | 0.3 | 5.7 | 1.0 | 0.96 | 0.85 |
| 60 | 8.1 | 0.4 | 6.7 | 1.8 | 0.95 | 0.79 |
| 80 | 8.6 | 0.5 | 6.8 | 2.3 | 0.95 | 0.75 |
| 95 | 9.7 | 0.6 | 6.8 | 3.5 | 0.94 | 0.66 |

The double decomposition reaction of the first step will be described in detail with reference to the accompanying drawing. The first step reaction in accordance with the present invention fundamentally proceeds as shown in the reaction formula (2). In order to cause sodium fluoride to precipitate or crystallize as much as possible and also to cause ammonium silicofluoride to produce in a dissolved form as much as possible, it is most preferable to charge sodium silicofluoride, ammonium fluoride and water in such ratios that the composition of solution obtained after completion of the precipitation of sodium fluoride is represented by the point G. In this connection, however, the solution composition is not necessarily required to fall just on the point G, but may be sufficient to be given by a region around the point G.

The over-all reaction velocity of the reaction formula (2) is greatly influenced by the concentration of ammonium fluoride and is increased with an increasing concentration of ammonium fluoride. For example, when sodium silicofluoride, ammonium fluoride and water are charged in such ratios that the solution composition obtained after completion of the reaction reaches the point G, it takes a long period of time, e.g., several hundreds hours, before the reaction is complete. In order to accelerate the reaction, the concentration of ammonium fluoride upon charging is preferred to be greater than about 20%. When, for example, 30% of ammonium fluoride is used for reaction with sodium silicofluoride in the same amount as employed in the above case, the reaction of sodium silicofluoride is complete within a time period of about 30 min. In the case, the solution composition obtained after completion of the reaction falls on the line GF, permitting sodium fluoride and NH$_4$F·(NH$_4$)$_2$SiF$_6$ to coprecipitate as shown in the following formula (5)

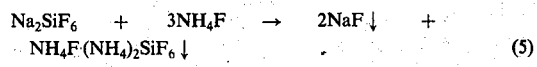

$$Na_2SiF_6 + 3NH_4F \rightarrow 2NaF\downarrow + NH_4F\cdot(NH_4)_2SiF_6\downarrow \quad (5)$$

The thus formed heptafluoride, NH$_4$F·(NH$_4$)$_2$SiF$_6$, is extremely soluble in water, so that the solution composition may be readily varied to fall on the point G by addition with a suitable amount of water or hot water.

The over-all reaction velocity of the reaction formula (2) is also influenced by reaction temperature. The reaction velocity increases with an increase of the reaction temperature. In general, the reaction temperature is required to be higher than a normal temperature.

In a preferred embodiment of the present invention, the double decomposition reaction expressed by the reaction formula (2) is required to be conducted under such conditions that the solution composition obtained after completion of the precipitation of sodium fluoride falls on the point G or around the line GF, i.e., lying within the triangular area bounded by the dotted lines ab, ac and bc wherein when the co-ordinates of any arbitrary point is expressed in terms of (X, Y), point a has the co-ordinates (0.99, 0.99), point b the co-ordinates (0.99, 0.61) and point c the co-ordinates (0.72, 0.72), and that SiF$_6^{2-}$ has a concentration of 4.2 to 0.3 gram equivalents/kg H$_2$O.

In order to satisfy the requirements, the charging composition should have an Na$_2$SiF$_6$/NH$_4$F ratio by gram equivalent of 0.01 to 0.4:1 and the reaction temperature should be within a range between room temperature and 100° C, preferably 40° and 95° C.

As described above, though the double decomposition reaction of the first step is preferred to be conducted such that the solution composition obtained after completion of the reaction is given by the point G or the area in the vicinity of the GF line, it may suffice to effect the reaction under such conditions as to ensure the composition lying within the area including the above-mentioned point or area, and bounded by the dotted lines ab, ac and bc.

Sodium fluoride obtained in accordance with the process of the invention becomes greater in crystal size as the reaction temperature increases, making it easier to separate by filtration. With the reaction temperature above 80° C, for example, there are obtained crystals of sodium fluoride having a size of 100 to 200 μ. The thus obtained sodium fluoride crystals generally have a purity greater than at least 98%.

Then, in the second step, the reaction proceeds fundamentally in accordance with the reaction formula (3), in which an excess of ammonia is required to be present so as to permit a sufficient amount of silica to precipitate. That is, ammonia should be added in a mole ratio of ammonia to fluorine ranging from 1.0 to 1.3, preferably 1.1 to 1.3. As a result, the pH of the solution obtained after completion of the reaction is in the range of approximately 8.0 to 9.5. In order to obtain silica crystals which are easily separable by filtration, the reaction temperature should preferably be as high as possible, e.g., in the range of 60° to 100° C. The reaction time is relatively short and is generally sufficient to be in the range of 20 to 60 min. The silica crystals are separated from the solution by filtration.

Though the ammonium fluoride solution obtained after the separation contains a small amount of sodium fluoride, any trouble will not be produced when the solution is either recycled to the first step or added with a sodium salt to convert ammonium fluoride to sodium fluoride for recovery.

In a preferred embodiment of the invention, at least part of the ammonium fluoride solution obtained in the second step is recycled to the first step. The solution contains free ammonia, so that when the solution is fed to the first step as it is, silica is produced in the first step though small in amount, lowering the purity of the sodium fluoride crystals. In order to avoid this, it is preferable to remove ammonia from the ammonium fluoride solution, for example, by a method using an evaporator or by a distillation method. When the ammonium fluoride solution used for recycling has a free ammonia content below 0.5%, no precipitation of silica takes place in the first step.

The ammonium fluoride solution obtained in the second step may be added with a sodium salt to convert the ammonium fluoride to sodium fluoride in accordance with the afore-indicated reaction formula (4). The ammonium fluoride solution has generally a high ammonium fluoride content of above 20%, so that an ammonium salt secondarily produced by the reaction correspondingly to a sodium salt employed and including, for example, ammonium chloride, ammonium hydrogencarbonate, ammonium sulfate or ammonium nitrate can be obtained in high concentration. Accordingly, the solubility of sodium fluoride in the solution becomes small by the saltingout effect of the ammonium salt. The thus obtained ammonium salts contained in the solution are conveniently usable as fertilizer or the like. In the reaction with a sodium salt as typically represented by the foregoing reaction formula (4), the sodium salt is generally added to the ammonium fluoride solution in an Na/F mole ratio of 1.0 to 1.5. When the solution contains a high content of ammonium fluoride, part of ammonium chloride or an ammonium salt corresponding to the added sodium salt is separated as crystals together with sodium fluoride. The thus separated ammonium salt crystals can be easily removed by washing with hot water upon separating the sodium fluoride by filtration, presenting no problem concerning the purity of sodium fluoride. The reaction temperature is desired to be in the range of 60° to 100° C. The fluorine concentration in the solution obtained after the filtration of sodium fluoride can be suppressed to a level of 0.3 to 1.0%.

Sodium fluoride and ammonium fluoride obtained in accordance with the process of the invention are both high in quality and are thus widely usable as starting material for producing a variety of fluorides such as aluminium fluoride, cryolite, etc. anti-septics for wood, and frosting agent for glass.

The present invention will be particularly described by the following examples.

EXAMPLE 1

(Composition Falling On Point G Through Line GF)

2168 g of a solution containing 650 g of ammonium fluoride (i.e., an $NH_4F$ concentration of 30%) was placed in a reactor equipped with an agitator, to which was further added 450 g of sodium silicofluoride having a purity of 98%, followed by reaction at 80° C for 30 min with agitation. As a result, the sodium silicofluoride was converted to sodium fluoride and $NH_4F \cdot (NH_4)_2SiF_6$ both in the form of crystals. To the slurry was added 526 g of hot water of 80° C, which was then agitated for 10 min to completely dissolve $NH_4F \cdot (NH_4)_2SiF_6$. The slurry contained sodium fluoride alone as solid component. The slurry was subjected to filtration and the resulting cake was washed with water and dried at a temperature of 105° C to obtain 160 g of sodium fluoride. The thus obtained sodium fluoride was subjected to a composition analysis in accordance with a method as prescribed in JIS K-1406, with the following results (the percent is by weight herein and whenever it appears hereinlater).

| NaF | water ($H_2O$) | free acid (F-HF) | free alkali (F-$Na_2O$) | sulfates ($SO_4$) | $Na_2SiF_6$ |
|---|---|---|---|---|---|
| 99.0% | 0.01% | 0.07% | 0.02% | 0.05% | 0.90% |

As will be understood from the above results, the sodium fluoride had a purity of 99.0%.

While, there was also obtained 2961 g of the filtrate or mother liquor having the following composition.

| $NH_4F$ | $(NH_4)_2SiF_6$ | $Na_2SiF_6$ | $H_2O$ |
|---|---|---|---|
| 17.3% | 11.1% | 3.0% | 68.6% |

This filtrate composition was found to correspond to that given by the point G(X = 0.95, Y = 0.75) at 80° C on the FIGURE. Then, 290 g of ammonia gas was passed into the filtrate at 70° C while agitating the filtrate for further reaction for 30 min. As a consequence, silica and a small amount of sodium fluoride were precipitated. The resulting slurry was cooled down to 40° C, from which the solid matters were separated by filtration to obtain 2957 g of a solution containing 957 g of ammonium fluoride.

The solution had the following composition.

| $NH_4F$ | NaF | F-$NH_3$ | $SiO_2$ | $H_2O$ |
|---|---|---|---|---|
| 32.4% | 0.2% | 4.5% | 0.1% | 62.8% |

The separated solid matters are composed of 136 g of $SiO_2$, 35 g of NaF and 123 g of the attached mother liquor.

EXAMPLE 2

(Composition Directly Falling On Point G)

Similarly to Example 1, 450 g of sodium silicofluoride having a purity of 98% was added to 2687 g of a solution containing 650 g of ammonium fluoride (i.e., $NH_4F$ concentration of 24.2%), followed by reaction at 80° C for 150 hours with agitation. As a result, the sodium silicofluoride disappeared and sodium fluoride was separated from the solution as crystals. The slurry was subjected to filtration and the resulting cake was washed with water and dried to obtain 160 g of sodium fluoride having the following composition.

| NaF | $H_2O$ | HF | $Na_2CO_3$ | $SO_4$ | $Na_2SiF_6$ |
|---|---|---|---|---|---|
| 99.1% | 0.01% | 0.05% | 0.02% | 0.05% | 0.76% |

Further, 2,961 g of the filtrate having the following composition was obtained.

| $NH_4F$ | $(NH_4)_2SiF_6$ | $Na_2SiF_6$ | $H_2O$ |
|---|---|---|---|
| 17.3% | 11.1% | 3.0% | 68.6% |

The filtrate composition was found to correspond to that given by the point G(X = 0.95, Y = 0.75) at 80° on the FIGURE.

Then, an aqueous 25% ammonia solution containing 290 g of ammonia was added to the filtrate over a time period of 30 min at 70° C while agitating the filtrate. As a result, silica and a small amount of sodium fluoride were separated as crystals. The slurry thus obtained was cooled down to 40° C and the solid matters were removed by filtration to obtain 3830 g of a solution with the following composition containing 957 g of ammonium fluoride.

| $NH_4F$ | FaF | $F-NH_3$ | $SiO_2$ | $H_2O$ |
|---|---|---|---|---|
| 25.0% | 0.2% | 3.4% | 0.1% | 71.3% |

The removed solid matters were composed of 136 g of $SiO_2$, 24 g of NaF and 131 g of the attached liquor.

EXAMPLE 3

(Composition Falling On In The Neighbourhood Of Point G)

2062 g of a solution containing 619 g of ammonium fluoride (i.e., $NH_4F$ concentration of 30%) was placed in a reactor equipped with an agitator, to which was further added 376 g of sodium silicofluoride, followed by reaction at 80° C for 30 min under agitating conditions. As a result, the sodium silicofluoride disappeared and sodium fluoride and $NH_4F\cdot(NH_4)_2SiF_6$ were separated as crystals, respectively. The slurry was added with 557 g of hot water of 80° C and then agitated for 10 min to completely dissolve the $NH_4F\cdot(NH_4)_2SiF_6$. Consequently, the slurry contained sodium fluoride alone as solid component. The slurry was filtered and the resulting cake was washed with water and dried at a temperature of 105° C to obtain 107 g of sodium fluoride with the following composition, together with 2877 g of the filtrate.

| NaF | $H_2O$ | HF | $Na_2CO_3$ | $SO_4$ | $Na_2SiF_6$ |
|---|---|---|---|---|---|
| 99.08% | 0.01% | 0.03% | 0.01% | 0.05% | 0.72% |

The obtained filtrate had the following composition.

| $NH_4F$ | $(NH_4)_2SiF_6$ | $Na_2SiF_6$ | $H_2O$ |
|---|---|---|---|
| 18.2% | 7.8% | 4.8% | 69.2% |

The filtrate composition was found to correspond to that given by the point (X = 0.92, Y = 0.78) on the FIGURE.

Then, 261 g of ammonia gas was blown in the filtrate at 70° C while agitating the filtrate, with the result that silica and a small amount of sodium fluoride were separated as crystals. The resulting slurry was cooled down to 40° C. Thereafter, the solid matters were removed by filtration to obtain 2848 g of a solution containing 874 g of ammonium fluoride. This solution had the following composition.

| $NH_4F$ | NaF | $F-NH_3$ | $SiO_2$ | $H_2O$ |
|---|---|---|---|---|
| 30.7% | 0.2% | 4.2% | 0.2% | 64.7% |

The removed solid matters were composed of 114 g of $SiO_2$, 54 g NaF and 122 g of the attached filtrate.

EXAMPLE 4

1000 g of the ammonium fluoride solution (having an $NH_4F$ concentration of 32.4%) obtained in Example 1 was added with 665 g of sodium chloride (such that an Na/F mole ratio was 1.3), followed by reaction at 60° C for 30 min. with agitation. The resulting reaction product was separated by filtration and washed with 400 g of hot water and dried to obtain 359 g of sodium fluoride having the following composition.

| NaF | F-HF | $F-Na_2CO_3$ | $SO_4$ | $Na_2SiF_6$ | Cl |
|---|---|---|---|---|---|
| 99.6% | 0.01% | 0.01% | 0.02% | 0.3% | 0.05% |

The fluorine concentration in the filtrate was found to be 0.5% and the conversion of ammonium fluoride sodium fluoride on the basis of fluorine was 97%.

EXAMPLE 5

1000 g of the ammonium fluoride solution (having an $NH_4F$ concentration of 32.4%) obtained in Example 1 was added with 683 g of sodium sulfate (such that an Na/F mole ratio was 1.1), followed by reaction at 60° C for 30 min with agitation. The resulting reaction product was separated by filtration, washed with 400 g of hot water of 70° C and dried to obtain 347 g of sodium fluoride having the following composition.

| NaF | F-HF | $F-Na_2CO_3$ | $SO_4$ | $Na_2SiF_6$ |
|---|---|---|---|---|
| 99.5% | 0.01; | 0.03; | 0.05% | 0.28% |

The fluorine concentration in the filtrate was found to be 0.86% and the conversion of ammonium fluoride to sodium fluoride based on fluorine was 94%.

What is claimed is:

1. A process for producing sodium fluoride from sodium silicofluoride comprising the steps of adding sodium silicofluoride to an ammonium fluoride solution in an $Na_2SiF_6/NH_4F$ ratio by gram equivalent of 0.01 to 0.4:1 for double decomposition reaction at a temperature ranging from room temperature to 100° C to give a slurry containing sodium fluoride as crystals and ammonium silicofluoride in a dissolved form, separating the sodium fluoride crystals from said slurry, adding ammonia to the separated solution to decompose said ammonium silicofluoride into silica and ammonium fluoride, and recovering said ammonium fluoride in a dissolved form and said silica in the form of crystals.

2. The process according to claim 1 wherein said temperature is in the range of from about 40° to 95° C.

3. The process according to claim 1, wherein said double decomposition reaction is conducted under such conditions that the composition obtained after completion of the double decomposition reaction lies within the area bounded by the dotted lines ab, ac and bc on the FIGURE and that $SiF_6{}^{2-}$ is contained in the composition in an amount of 4.2 to 0.3 gram equivalent/kg.$H_2O$.

4. The process according to claim 1 wherein said ammonia is added in an ammonia/fluorine mole ratio of 1.0 to 1.3.

5. The process according to claim 1 wherein the addition of ammonia is conducted at a temperature of from between about 60° to 100° C.

6. The process according to claim 1 and further comprising recycling part or all of the separated ammonium fluoride solution to the first step for the double decomposition reaction.

7. The process according to claim 1 and further comprising adding a sodium salt to the separated ammonium fluoride solution in an Na/F mole ratio of 1.0 to 1.5 to convert said ammonium fluoride to sodium fluoride.

8. The process according to claim 7, wherein the addition of said sodium salt is effected at a temperature of from between about 60° to 100° C.

* * * * *